(12) United States Patent
Hopfer, III et al.

(10) Patent No.: US 9,564,761 B2
(45) Date of Patent: Feb. 7, 2017

(54) CONFORMABLE WEARABLE BATTERY WITH REMOVABLE COMMAND MODULE

(71) Applicant: Palladium Energy, Inc., Woodridge, IL (US)

(72) Inventors: Albert Nicholas Hopfer, III, Rolling Meadows, IL (US); William Mark Batts, Elburn, IL (US); Kenneth Habegger, Naperville, IL (US)

(73) Assignee: PALLADIUM ENERGY, INC., Woodridge, IL (US)

( * ) Notice: Subject to any disclaimer, the term of this patent is extended or adjusted under 35 U.S.C. 154(b) by 194 days.

(21) Appl. No.: 14/550,184

(22) Filed: Nov. 21, 2014

(65) Prior Publication Data

US 2016/0233695 A1 Aug. 11, 2016

(51) Int. Cl.
| | |
|---|---|
| *H02J 7/00* | (2006.01) |
| *H01M 2/10* | (2006.01) |
| *H01M 10/42* | (2006.01) |
| *H01M 10/48* | (2006.01) |
| *H01M 6/42* | (2006.01) |
| *H01M 6/46* | (2006.01) |
| *H01M 6/50* | (2006.01) |
| *G06F 1/32* | (2006.01) |

(52) U.S. Cl.
CPC ........... *H02J 7/0014* (2013.01); *G06F 1/3212* (2013.01); *G06F 1/3275* (2013.01); *G06F 1/3287* (2013.01); *H01M 2/1022* (2013.01); *H01M 2/1033* (2013.01); *H01M 2/1061* (2013.01); *H01M 2/1066* (2013.01); *H01M 6/42* (2013.01); *H01M 6/46* (2013.01); *H01M 6/505* (2013.01); *H01M 10/425* (2013.01); *H01M 10/4257* (2013.01); *H01M 10/48* (2013.01); *H02J 7/007* (2013.01); *H02J 7/0045* (2013.01); *H01M 6/5066* (2013.01); *H01M 2220/30* (2013.01); *H02J 2007/0098* (2013.01)

(58) Field of Classification Search
CPC ............................. H02J 7/0068; H02J 7/0014; H02J 2007/0098; G06F 1/3212; G06F 1/3275; G06F 1/3287
USPC ......................................................... 320/128
See application file for complete search history.

(56) References Cited

U.S. PATENT DOCUMENTS

| | | | |
|---|---|---|---|
| 5,075,182 A | 12/1991 | Weber | |
| 5,188,231 A | 2/1993 | Kivell et al. | |
| 5,235,967 A * | 8/1993 | Arbisi | A61H 23/0218 601/101 |
| 5,666,006 A * | 9/1997 | Townsley | H02J 7/0024 307/43 |
| 5,966,079 A | 10/1999 | Tanguay | |
| 6,027,828 A | 2/2000 | Hahn | |
| 6,222,342 B1 | 4/2001 | Eggert et al. | |

(Continued)

*Primary Examiner* — M'Baye Diao
(74) *Attorney, Agent, or Firm* — Babcock IP, PLLC

(57) ABSTRACT

A battery assembly has a command module with a power connection interface and a battery matrix interface. A battery matrix has a plurality of battery cells, an electrically erasable programmable read only memory (EEPROM) and a command module interface. The battery matrix interface may be removably interconnected with the command module interface, enabling power delivery from the battery matrix through the command module to the power connection interface and review of the EEPROM for capacity feedback with respect to remaining electrical power of the battery matrix.

15 Claims, 5 Drawing Sheets

(56) References Cited

U.S. PATENT DOCUMENTS

| | | | |
|---|---|---|---|
| 6,365,297 B1* | 4/2002 | Wolczak | H01M 2/1083 |
| | | | 429/151 |
| 6,426,606 B1 | 7/2002 | Purkey | |
| 6,586,850 B1* | 7/2003 | Powers | A61N 1/3975 |
| | | | 307/150 |
| 6,636,015 B1 | 10/2003 | Levine et al. | |
| 6,977,123 B1 | 12/2005 | Burroughs et al. | |
| 7,161,253 B2 | 1/2007 | Sodemann et al. | |
| 7,301,303 B1 | 11/2007 | Hulden | |
| 7,505,856 B2 | 3/2009 | Restaino et al. | |
| 7,759,902 B2* | 7/2010 | Gangsto | H02J 7/0016 |
| | | | 320/132 |
| D623,126 S | 9/2010 | Contreras | |
| 8,058,842 B2 | 11/2011 | Kai et al. | |
| 8,188,876 B1 | 5/2012 | Holley et al. | |
| 8,203,345 B2 | 6/2012 | Carroll et al. | |
| 8,691,416 B1 | 4/2014 | Carroll et al. | |
| 8,927,137 B2* | 1/2015 | Ayub | H01M 2/1061 |
| | | | 429/149 |
| 8,954,610 B2* | 2/2015 | Berke | G06F 1/12 |
| | | | 370/476 |
| 2009/0082957 A1* | 3/2009 | Agassi | B60L 3/12 |
| | | | 701/532 |
| 2009/0291361 A1* | 11/2009 | Scorziello | H01M 6/16 |
| | | | 429/150 |

\* cited by examiner

CONFORMABLE WEARABLE BATTERY WITH REMOVABLE COMMAND MODULE

This invention was made with government support under contract no. W15P7T-13-C-A906 awarded by the United States Department of the Army. The Government has certain rights in the invention.

BACKGROUND

Field of the Invention

The invention relates to an electrical power storage system. More specifically, the invention relates to a multiple cell battery system with a removable and thus reusable command module, providing disposable battery cells with smart battery functionality.

Description of Related Art

Integrated communications and/or weapons gear utilized, for example, by law enforcement and/or military personnel requires increasingly high levels of power storage carried proximate the users body. A Conformable Wearable Battery (CWB) is a battery configured for integration with a users body armor, tactical vests, load bearing equipment and/or haul harness, providing mobile electrical power with reduced weight, improved user ergonomics and fail safe characteristics.

A rechargeable CWB with fail safe characteristics is disclosed in copending US Patent Application Publication No. 20130295434, owned by Applicant and hereby incorporated by reference in the entirety. Each rechargeable CWB provides electrical power with smart battery functionality including an on-battery power switch and remaining power visual feedback. The battery type and status information may also remotely queried via a data bus incorporated into the battery power connection interface.

Primary batteries (single use, non-rechargeable) are well known. Although primary battery chemistries typically enable higher energy storage density and lower cost materials, it may be difficult to accurately detect remaining power levels of primary batteries.

Competition within the mobile electrical power storage industry has focused attention upon increasing power capacity while simultaneously reducing size, weight and cost.

Therefore, it is an object of the invention to provide a mobile electrical power storage system that overcomes deficiencies in such prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
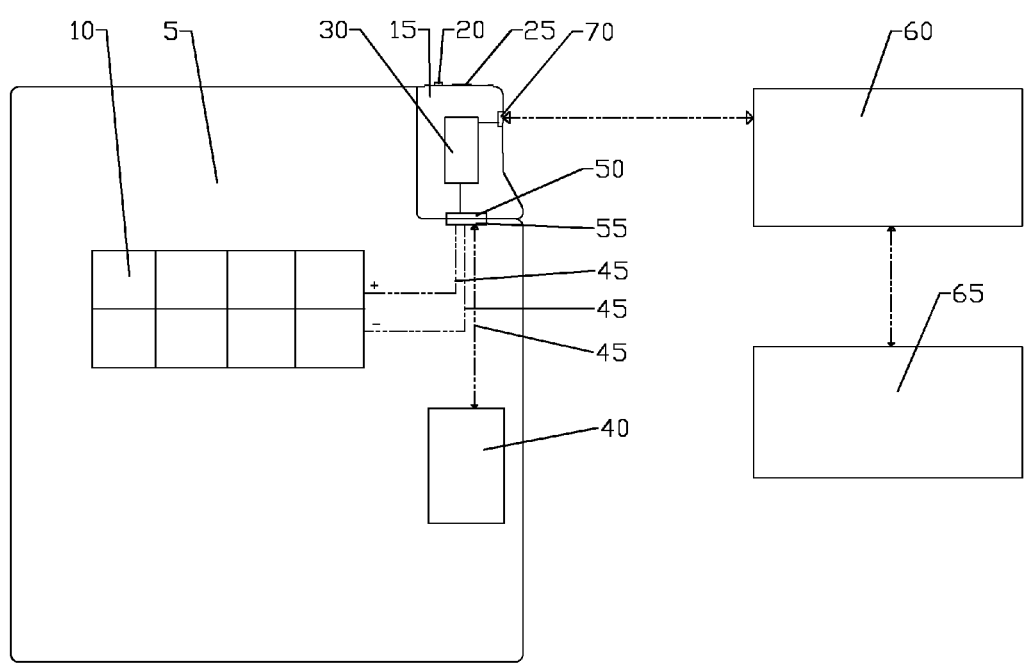
FIG. 1 is a schematic block diagram of an exemplary battery matrix and command module CWB assembly coupled to a power management system and load.
Figure 2:
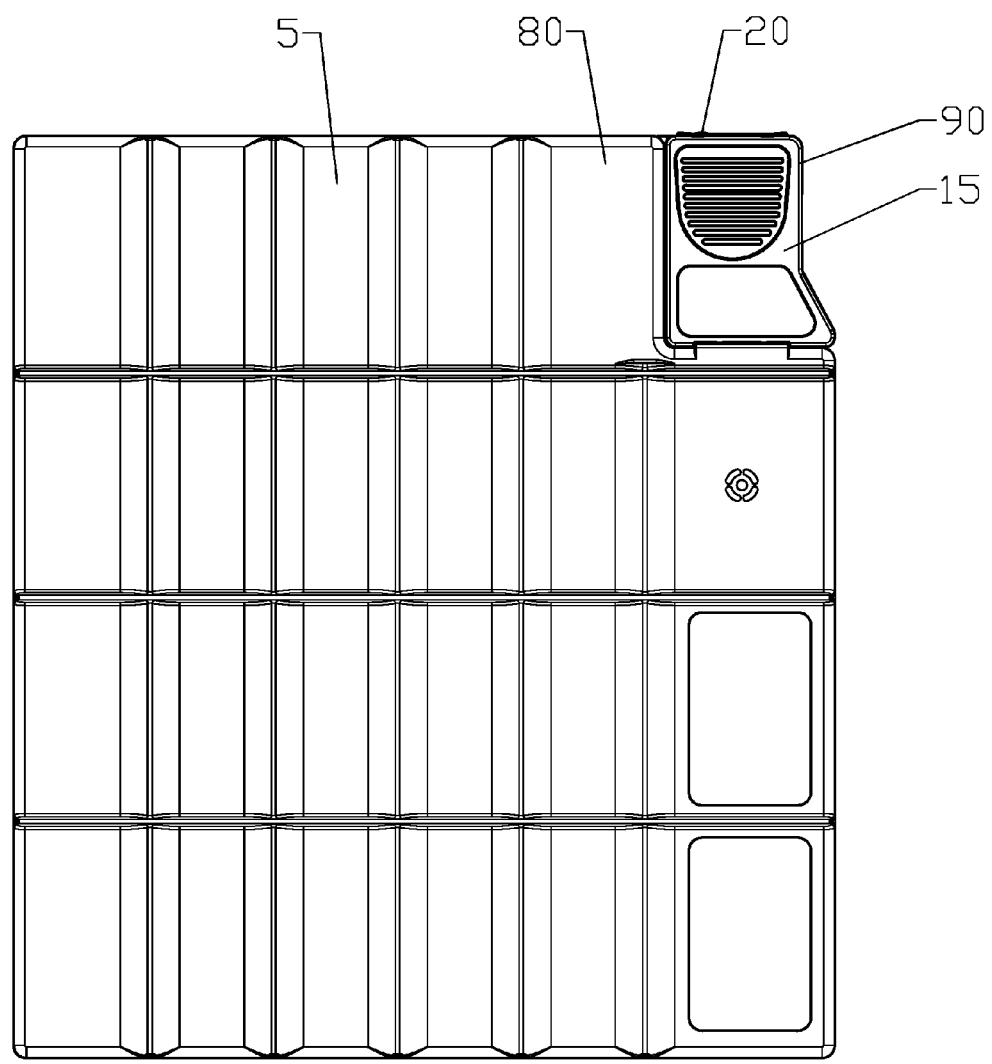
FIG. 2 is a schematic front view of a CWB assembly, with the command module interconnected with the battery matrix.

The inventors have recognized that utilizing rechargeable CWBs may be cost prohibitive, particularly where the CWB is discharged only once and then abandoned, without being recharged/reused. Also, recharging apparatus may increase the users overall equipment load and may require an unacceptable charge time before re-use is possible, even if a suitable charging power source is available.

FIGS. 1-5 demonstrate an exemplary CWB assembly 1 with a battery matrix 5 comprising a plurality of battery cells 10 with a removable and reusable command module 15. The command module 15 includes a power switch 20 and capacity feedback 25 of the remaining battery electrical power delivery capacity (depletion). Processor circuitry 30 within the command module includes a System Management Bus (SMB) for communication with devices coupled to the CWB via a power connection interface 35 and read/write functionality for an Electrically Erasable Programmable Read Only Memory (EEPROM), such as a serially programmable interface EEPROM.

The EEPROM 40, integrated with the battery matrix 5, may include read only registers for status and/or identifying data indicating:
  Battery type
  Initial Voltage
  Cell Chemistry
  Design Capacity
  Serial Number
which may be written to the EEPROM 40 during battery matrix 5 and/or EEPROM 40 manufacture. A further Remaining Capacity register may be read/writeable by the command module 15 based on the identifying data in view of current and voltage usage detected by the command module 15.

Registers within the processor circuitry 30, which may be readable over the SMB by a device being powered by the CWB assembly 1, may include:
  Remaining Capacity Alarm
  Pack Voltage
  Pack Current
  Relative State of Charge
  Battery Status
  Design Capacity
  Design Voltage
  Manufacture Date
  Serial Number
Thereby, devices coupled to the power connection interface 70 may also query and receive a power level indication of the attached battery matrix 5, via SMB communication.

Where the EEPROM 40 is a serially programmable type, only a single conductor 45 is required for EEPROM 40 read/write communication. The command module 15 energizes the line when data is high, and a capacitor in the EEPROM 40 provides stand-by power during a low data bit state. Therefore, the electrical connections between the command module 15 and the battery matrix 5 may comprise only three conductors: the power and ground contacts from the battery cell 10 and the EEPROM 40 read/write lead.

The battery matrix 5 is preferably provided environmentally sealed. Electrical connections between a battery matrix interface 50 of the command module 15 and a command module interface 55 of the battery matrix 5 may be configured for an environmentally sealed interconnection therebetween.

The interconnections between the command module 15 and the attached power management system 60 and/or load 65, via a power connection interface 70 of the command module, may also be environmentally sealed, for example utilizing a standard sealable 7 pin CWB power connection interface (such as GlenAir connector Part Number 807-348-01ZNU6-7SY) including conductors allocated for SMB data, SMB clock, and the Battery Matrix power and ground (routed from the command module interface 55 and battery matrix interface 50, through the command module). Where the battery cells are primary type single use chemistry, additional conductors of the power connection interface 70 supporting interconnection with rechargeable type battery cells (such as a charge port pin) may be left unconnected and/or coupled to ground.

Figure 3:
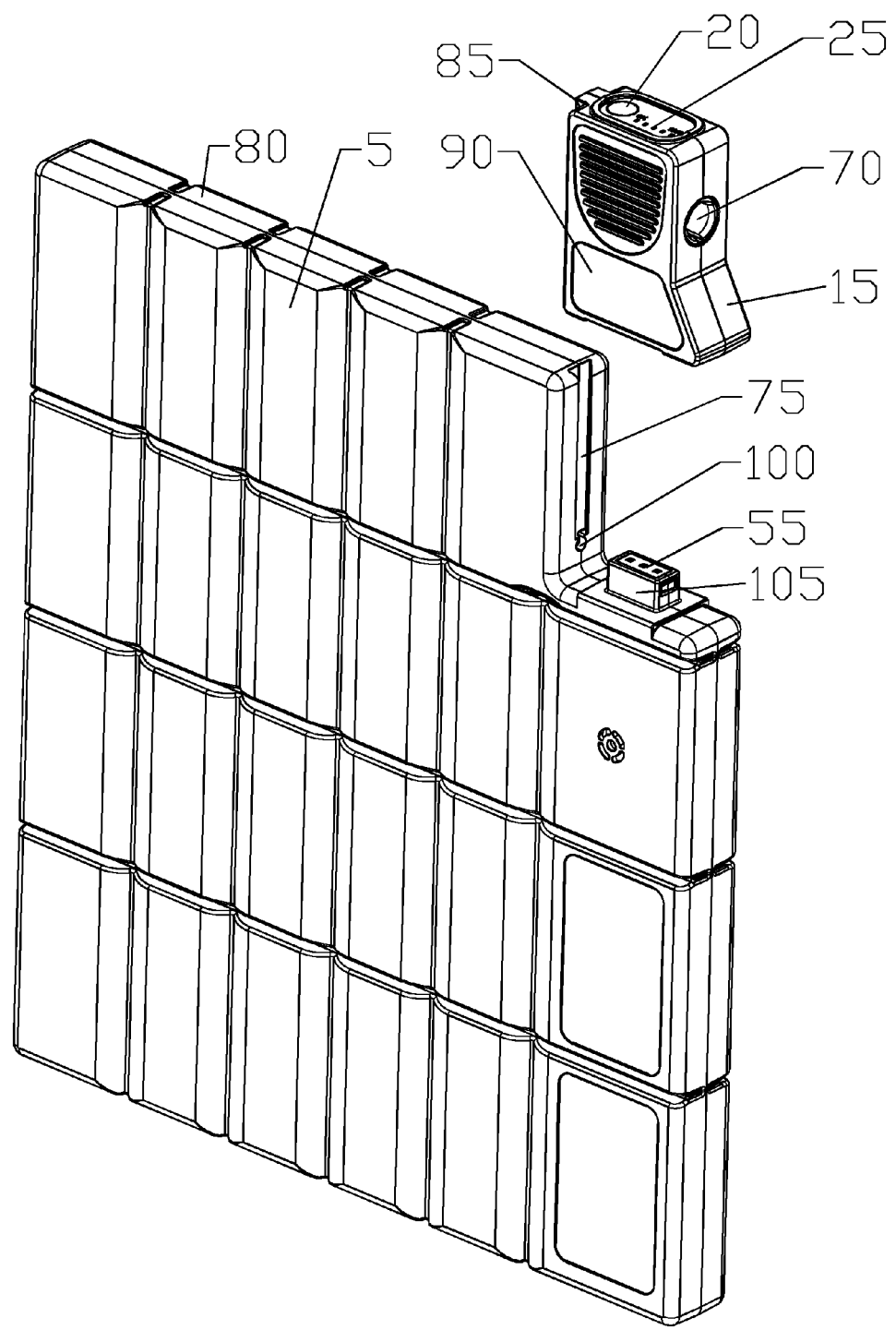
FIG. 3 is a schematic isometric view of the CWB assembly of FIG. 2, with the command module aligned for interconnection with the battery matrix.
Figure 4:
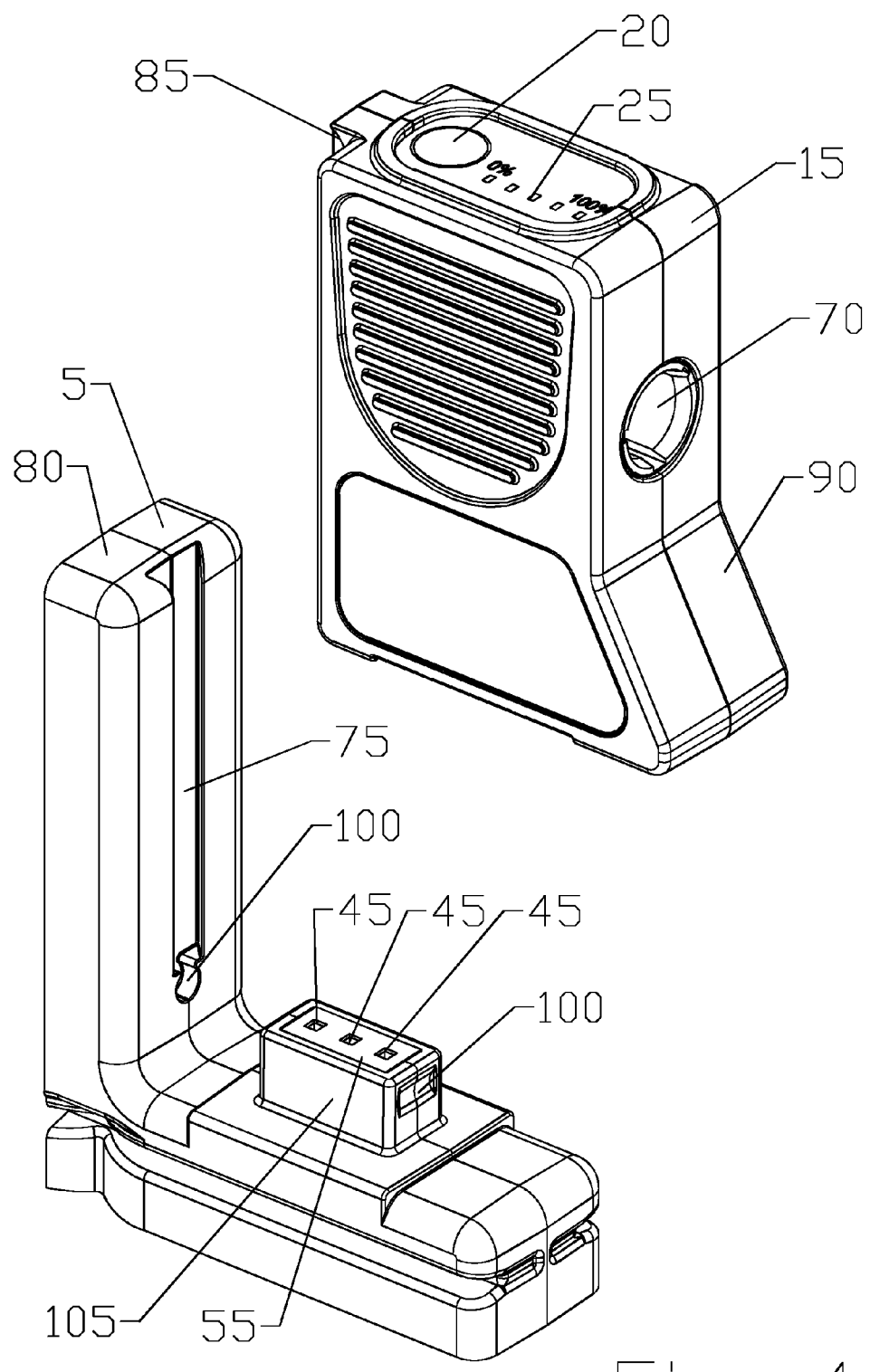
FIG. 4 is a close-up isometric view of the command module and battery matrix, showing interconnection features and the command module interface.

As best shown in FIGS. 3 and 4, alignment for mechanical interconnection and subsequent retention of the command module 15 upon the battery matrix 5 may be via, for example, a retention slot 75 or the like of the battery matrix overbody 80 and a retention fin 85 of the command module case 90 that dovetail together to aligns the, for example, pins of the battery matrix interface 50 with sockets of the command module interface 55. As the retention fin 85 interlocks with and travels to the bottom of the retention slot 75, pins of the battery matrix interface 50 may pierce a sealing membrane of the command module interface 55 before seating within the sockets.

Figure 5:
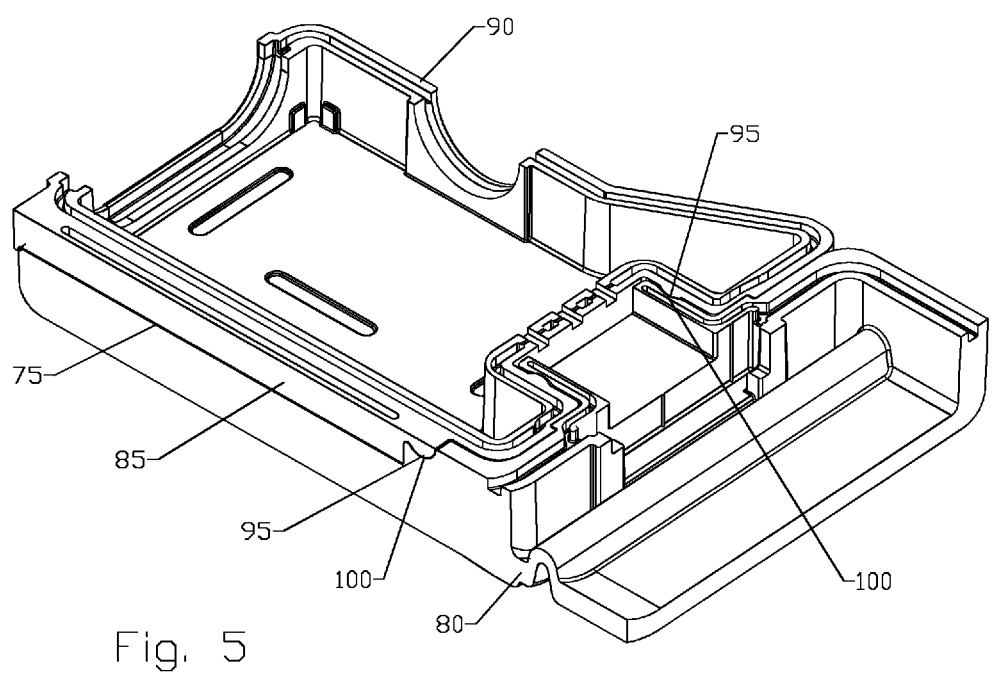
FIG. 5 is a schematic isometric view of a cut-away portion of the battery matrix housing and command module case, demonstrating exemplary retainer and receiver interconnection features.

Further retention features of the retention slot and retention fin may include retainer features 95 such as notches or tabs dimensioned to seat within corresponding receiver features 100 such as sockets or pockets, as best shown in FIG. 5.

Enhanced protection of the command module 15 and battery matrix 5 electrical interconnection may be obtained by providing a raised base 105 of the interconnection area extending from the battery matrix 5, so that a cover portion 110 of the command module case 90 overlaps the raised base 105, protecting both the pins of the battery matrix interface 50 prior to interconnection and extending the sealing surface surrounding the interconnection. Further retainer features 100 dimensioned to seat within corresponding receiver features 100 may also be applied to sidewalls of the raised base 105.

With the command module 15 interconnected with the battery matrix 5, electrical power delivery from the battery matrix 5 and/or the capacity feedback 25 may be enabled by actuating the power switch 20. Capacity feedback 25 of the battery remaining power level may be, for example, via a plurality of light emitting diodes (LED) or the like. For example, where five out of five light emitting diodes are energized, a full power delivery capacity is represented, while a lower number of illuminated LEDs represents a corresponding reduction in available electrical power. The capacity feedback 25 may be configured for activation for a predetermined time period upon actuation of the power switch 20, before returning to a non-illuminated stand-by state.

While interconnected, the command module monitors the current and voltage delivered by the battery matrix 5. Upon a change of state, time interval and/or upon initial actuation and then deactivation, the command module 5 calculates and writes an updated value to the Remaining Capacity register of the connected battery matrix EEPROM 40. Thereby, an accurate measure of the remaining power capacity remains with the battery matrix 5 even if the amount and/or intensity of any prior usage is unknown.

One skilled in the art will appreciate that because the command module is reusable, the battery matrix 5 of disposable cells with integral EEPROM 40 data storage enables a higher energy storage capacity and significantly reduced cost, compared to a rechargeable CWB. Because the battery matrix 5 are disposable, the users load may be reduced with each battery matrix 5 discharged and discarded, increasing user gear capacity and/or mobility.

Further, a single command module 15 may be quickly exchanged between a supply of battery matrix 5 to verify remaining capacity, with the specific capacity of each battery matrix 15 accurately reflected in view of the data, specific to battery type and past usage, which remains with each respective battery matrix 15 even if disconnected/exchanged. Thereby, the depletion curve characteristic of specific battery chemistries may be considered and incorporated into the capacity feedback 25, instead of just current voltage of the battery cells, resulting in accurate and cost efficient capacity feedback 25 for a disposable battery matrix 15.

Finally, because the electrical interconnection between the command module 15 and the battery matrix 5 may be provided with as few as three electrical contacts, the interconnection may be cost efficiently provided with mechanically robust and securely environmentally sealed characteristics, improving the reliability of the resulting CWB assembly 1 mobile power delivery system.

Although the benefits of battery matrix 5 using single use battery cells has been described in detail, one skilled in the art will appreciate that a battery matrix 5 utilizing these solutions with rechargeable battery chemistries is also envisioned, with similar cost, ease of power level monitoring and/or battery matrix 5 exchange benefits.

| Table of Parts | |
|---|---|
| 1 | CWB |
| 5 | battery matrix |
| 10 | battery cell |
| 15 | command module |
| 20 | power switch |
| 25 | capacity feedback |
| 30 | processor circuitry |
| 35 | power connection interface |
| 40 | EEPROM |
| 45 | conductor |
| 50 | battery matrix interface |
| 55 | command module interface |
| 60 | power management system |
| 65 | load |
| 70 | power connection interface |
| 75 | retention slot |
| 80 | overbody |
| 85 | retention fin |
| 90 | case |
| 95 | retainer feature |
| 100 | receiver feature |
| 105 | raised base |

Where in the foregoing description reference has been made to ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A battery assembly, comprising:
   a command module with a power connection interface and a battery matrix interface;
   a battery matrix with a plurality of battery cells, an electrically erasable programmable read only memory (EEPROM) and a command module interface;
   a retention slot provided in an overbody of the battery matrix and a retention fin protruding from a case of the command module; the retention fin mating with the retention slot, aligning the command module interface with the battery matrix interface;
   the battery matrix interface removably interconnected with the command module interface; and
   the EEPROM electrically connected to the command module via the command module interface;
   the plurality of battery cells electrically connected to the command module via the command module interface and through the command module to the power connection interface.

2. The battery assembly of claim 1, wherein the battery matrix interface has three conductors.

3. The battery assembly of claim 1, further including a capacity feedback on the command module.

4. The battery assembly of claim 1, wherein the capacity feedback is a plurality of light emitting diodes.

5. The battery assembly of claim 1, further including a main power switch on the command module;
   the main power switch operable to electrically couple the plurality of battery cells with the power connection interface.

6. The battery assembly of claim 5, wherein the main power switch also actuates a capacity feedback on the command module.

7. The battery system of claim 1, wherein the power connection interface includes conductors of a system management bus.

8. The battery assembly of claim 1, wherein the battery cells are single use battery cells.

9. A battery assembly, comprising:
   a command module with a power connection interface and a battery matrix interface;
   a battery matrix with a plurality of battery cells, an electrically erasable programmable read only memory (EEPROM) and a command module interface;
   the battery matrix interface removably interconnected with the command module interface; and
   the command module interface is provided on a raised base of a housing of the battery matrix; a cover portion of the command module covering the raised base when the command module interface is interconnected with the battery matrix interface;
   the EEPROM electrically connected to the command module via the command module interface;
   the plurality of battery cells electrically connected to the command module via the command module interface and through the command module to the power connection interface.

10. A method for monitoring the power level of a battery matrix, comprising;
    coupling a command module to the battery matrix;
    reading an electrically erasable programmable read only memory (EEPROM) of the battery matrix; and
    coupling one or both of a power management system and a load to a power connection interface of the command module and reading a value of an EEPROM data obtained by the command module, via a system management bus.

11. The method of claim 10, further including the step of illuminating a capacity feedback corresponding to a monitored power level.

12. The method of claim 11, wherein the illumination of the capacity feedback is for a preset period from actuation of a main power switch of the command module.

13. The method of claim 10, wherein the coupling between the command module and the battery matrix is via insertion of a retention fin protruding from a case of the command module into a retention slot provided in an overbody of the battery matrix;
    the retention fin mating with the retention slot aligning a command module interface of the battery matrix with a battery matrix interface of the command module.

14. The method of claim 10, wherein the EEPROM includes a read-only identifying data indicating a battery type.

15. The method of claim 10, wherein the EEPROM includes a read-only identifying data indicating a cell chemistry of the battery matrix.

* * * * *